Figure 1:
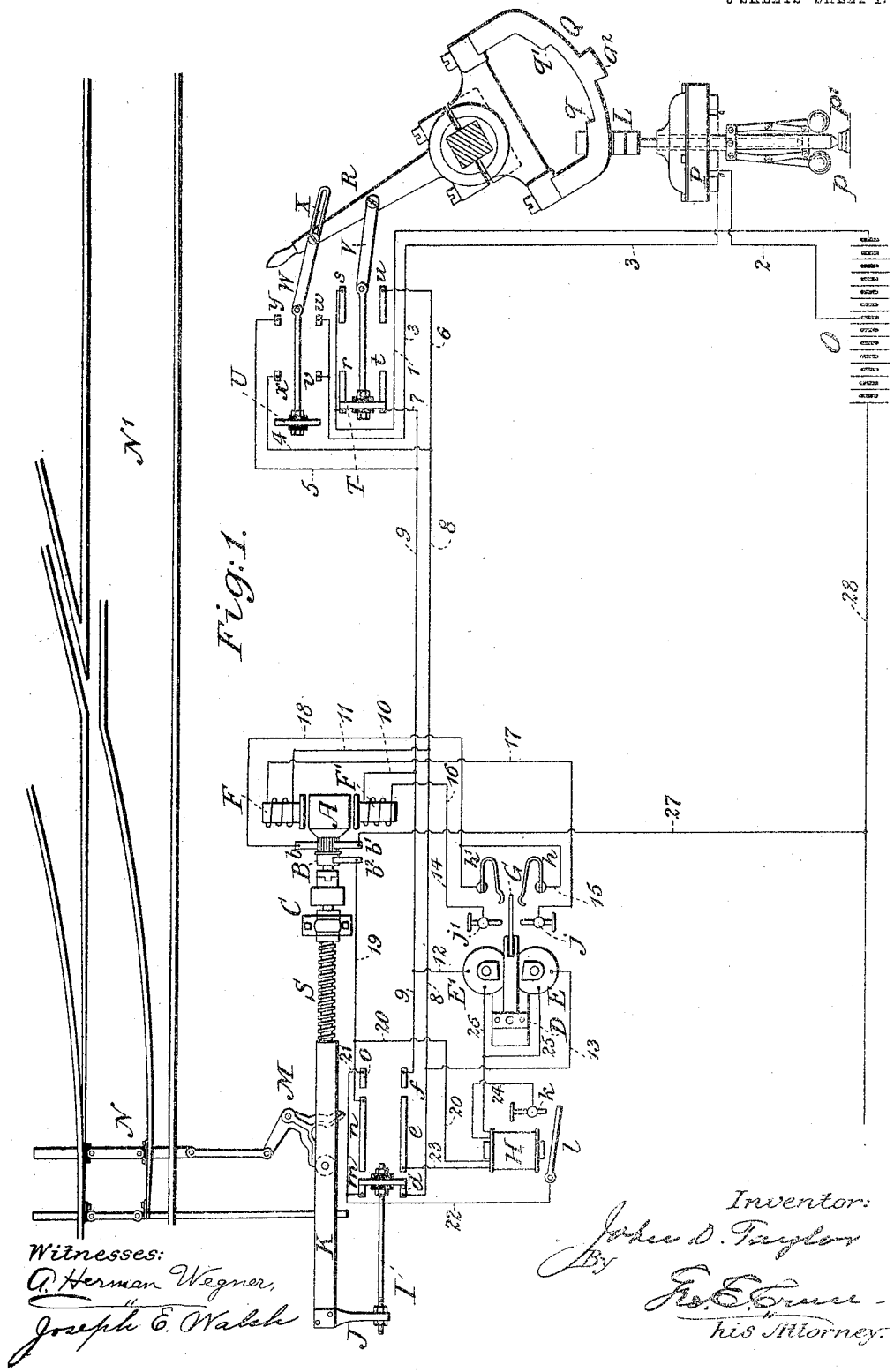

No. 887,290. PATENTED MAY 12, 1908.
J. D. TAYLOR.
CONTROL OF APPARATUS GOVERNING THE PASSAGE OF CARS OR VEHICLES ALONG A RAILWAY.
APPLICATION FILED AUG. 23, 1906.

3 SHEETS—SHEET 1.

Witnesses:
A. Herman Wegner,
Joseph E. Walsh

Inventor:
John D. Taylor
By
his Attorney.

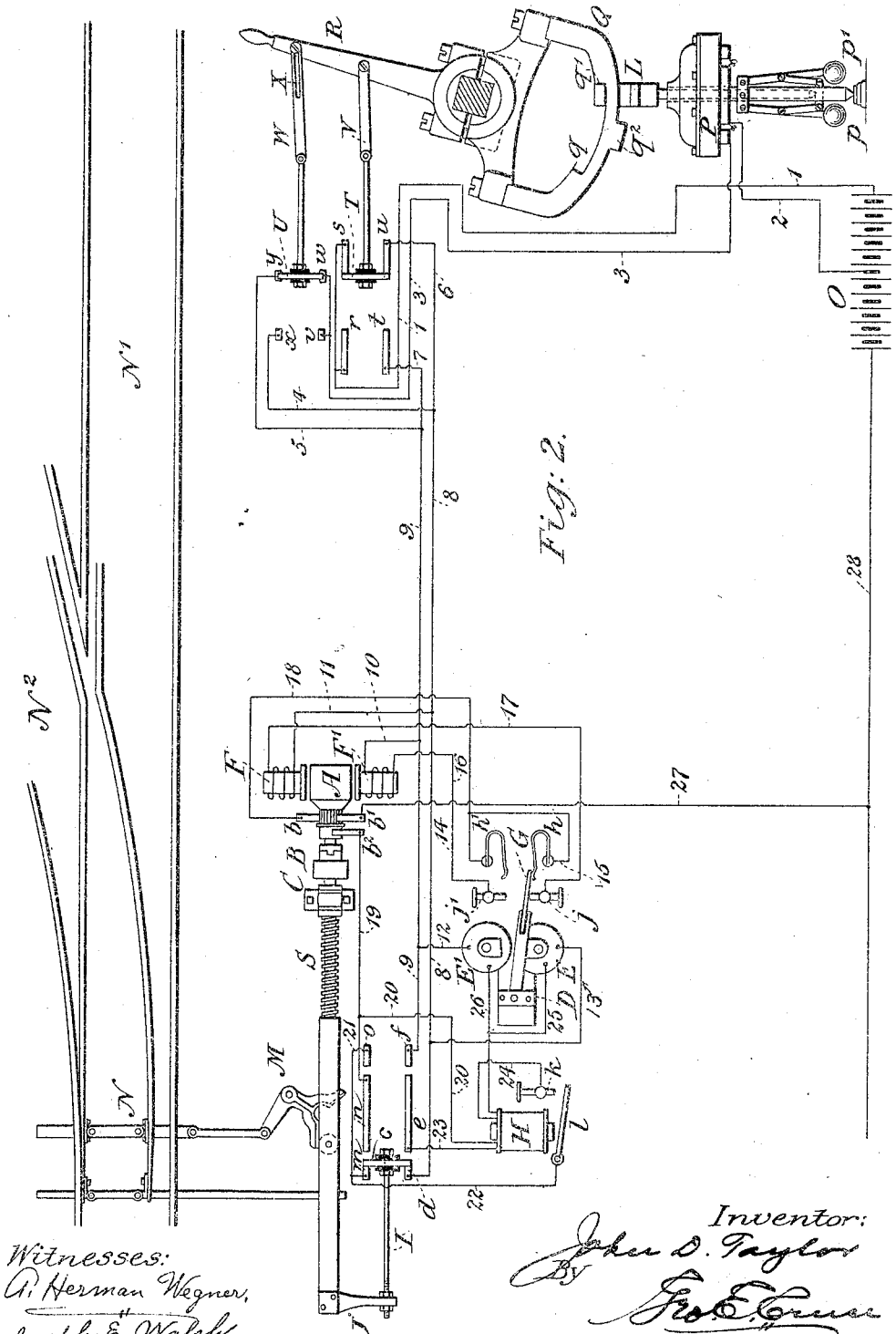

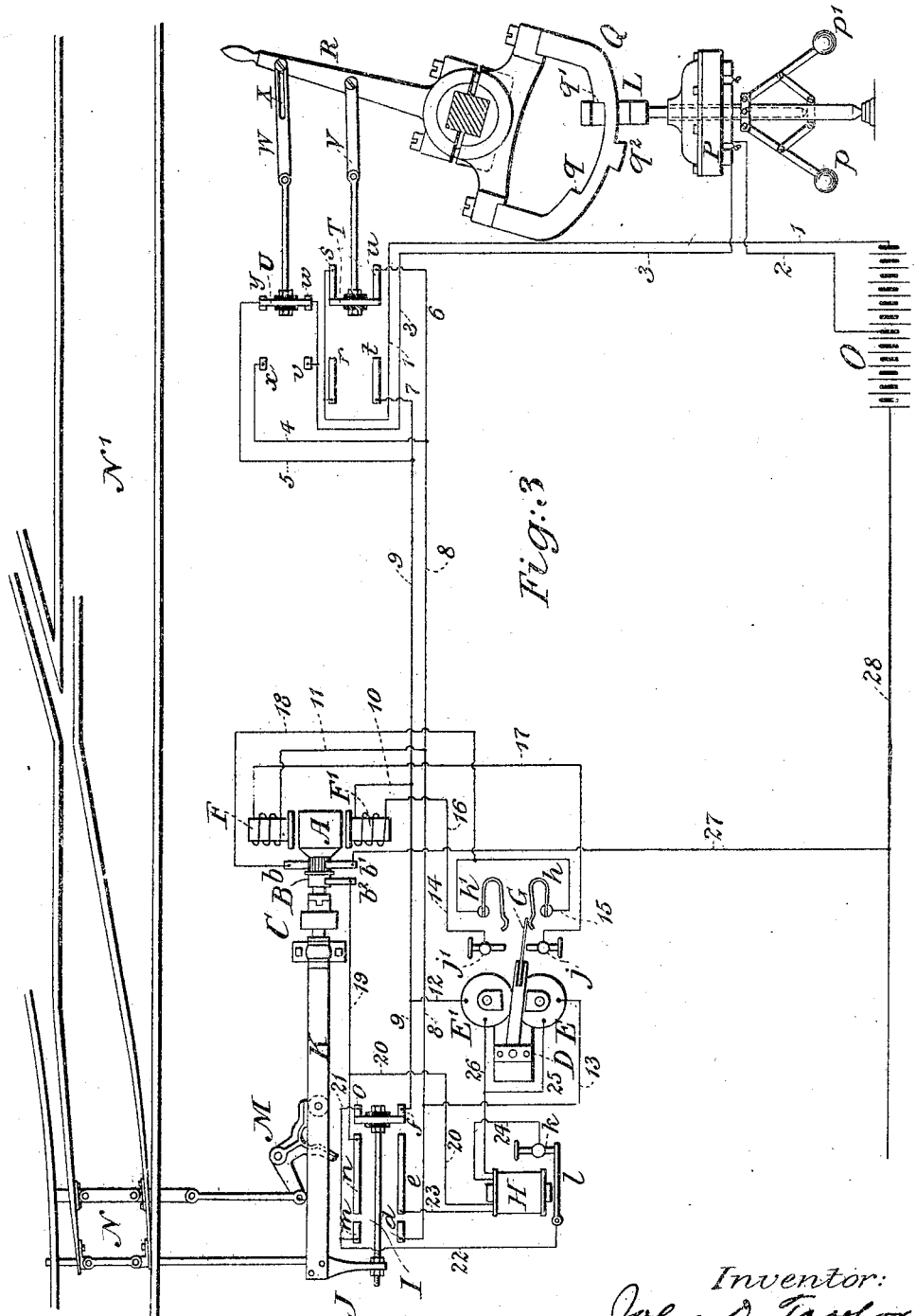

UNITED STATES PATENT OFFICE.

JOHN D. TAYLOR, OF PITTSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

CONTROL OF APPARATUS GOVERNING THE PASSAGE OF CARS OR VEHICLES ALONG A RAILWAY.

No. 887,290.     Specification of Letters Patent.     Patented May 12, 1908.

Application filed August 23, 1906. Serial No. 331,712.

*To all whom it may concern:*

Be it known that I, JOHN D. TAYLOR, a citizen of the United States, residing at Pittsburg, in the county of Allegheny and State of Pennsylvania, have invented certain new and useful Improvements in the Control of Apparatus Governing the Passage of Cars or Vehicles Along a Railway, of which the following is a specification.

My invention relates to the control of apparatus for governing the passage of cars or vehicles along a railway.

My invention is particularly adapted to the control of such apparatus comprising an electric motor, and has for an object to prevent a movement of the part or appliance controlling the passage of cars or trains, be it a switch rail or signal, from one position to another without a preliminary movement of the controlling lever for the part or appliance, irrespective of whether the force tending to move the part or appliance be mechanical or electrical, the latter due more particularly to accidental or other contact of electrical conductors.

In the drawings I have illustrated my invention in connection with a railway switch, but it is to be understood that it is not limited to such an application.

I will describe an apparatus for moving a railway switch and a system of control of the usual operation of such apparatus embodying my invention and then point out the novel features thereof in claims.

In the accompanying drawings, Figure 1 is a diagrammatic view of an apparatus for moving switch rails, a system of conductors and devices involved therein for controlling the operation of the apparatus and involving my invention. The positions of the parts of the apparatus and the condition of the circuits of the system and devices involved therein are such as would prevail after a complete operation of the apparatus, etc., to produce a movement of the switch rails from "reverse" position to "normal" position. In other words, the Fig. 1 illustrates the position of parts and condition of the circuits and apparatus when the switch rails are in "normal" position. Fig. 2 is a view similar to Fig. 1 showing the condition of the circuits of the system and devices involved therein upon a preliminary movement of a controlling lever to cause a movement of the switch rails to their "reverse" position, Fig. 3, is a diagrammatic view showing the position of apparatus after the switch rails have been moved to their reverse position and the condition of the circuits of the system and apparatus therein, after the "reverse" movement and during "indication" of the reverse movement.

Similar letters of reference designate corresponding parts in all of the figures.

Referring now to the drawings, $N^1$ designates a portion of a railway track, $N^2$ a portion of a turnout or crossover, and N a switch for directing cars or trains onto and off the track $N^1$. The switch N is suitably connected with any of the well known switch and lock movements, comprising an electric motor for operating the switch and lock movement. Such portions of the switch and lock movement as are shown are the same as that set forth in my co-pending application, filed April 18, 1904, Serial No. 203,645. As shown, the armature A of the motor is connected with a screw S through a clutch C, so that the rotation of the armature may be imparted to the longitudinally moving motion plate K. As stated, this is all set forth in my co-pending application hereinbefore referred to. Also connected with the motion plate K by a suitable connection J is the movable member I of a suitable form of circuit controller. The movable member I carries a contact $c$ which contacts with the pairs of stationary contacts $m, d; n, e; o, f$.

The electric motor comprised in the switch and lock apparatus is preferably of the type disclosed in my co-pending application, filed September 14, 1904, Serial No. 224,421. That is, it comprises two independent field coils by means of which the direction of rotation of the armature may be reversed, and a ring B suitably insulated from the armature shaft and which is electrically connected with a segment of the armature A. The purpose of this ring is to rapidly reverse the polarity of the unidirectional current employed to operate the motor, thus producing in effect an alternating current for indication purposes. This has all been clearly set forth in the application, Serial No. 224,421, hereinbefore referred to.

R designates a lever for controlling the operation of the switch and lock apparatus connected with the switch rails N. A number of such levers are comprised in, what is termed in the art, an "interlocking machine." In these machines the levers are generally provided with mechanism known in the art as "indicating mechanism", which mechanism is actuated to release its lever upon a complete operation of the apparatus controlled by the lever, thereby permitting the lever to be moved to its final position and release or lock through what is known as "mechanical interlocking" other levers which may control other apparatus. This is all well understood in the art. The indicating mechanism may comprise a locking member Q movable with the lever and provided with shoulders $q$, $q^1$, and a lug $q^2$, a latch L co-acting with the member Q in the usual manner, and an electro-magnetic apparatus P, comprising a centrifuge, of which $p$, $p^1$ are the weights thereof. Upon the rotation of the centrifuge, the latch L is lifted to release the lever. This form of indicating mechanism and its operating mechanism is fully set forth in my co-pending application filed Jan. 17, 1905, Serial No. 241,473.

Each controlling lever operates a circuit controller for controlling the supply of operating current to the motor of the switch and lock apparatus, and the indication current. Each circuit controller preferably comprises two movable parts, one of which movable portions preferably having a loose connection between it and the lever so that certain lost motion will result before it is moved by the lever. T, U, designate the movable parts. The part T is so connected with the lever as to always move with it and engages fixed contacts $r$, $t$ and $s$, $u$. The part U, as shown, is connected with the lever by an arm having a slot X, and engages the fixed contacts $x$, $v$, $y$, $w$. The purpose of this loose connection is to prevent again closing the last indication circuit when the lever is moved to the opposition position. The action is as follows: In the movement from "normal" position shown in Fig. 1, to the "reverse indicating" position shown in Fig. 2, the contact T starts to move simultaneously with the lever R but the contact U remains stationary until the lost motion, due to the slot X, is taken up. This permits the contact T to pass off the contacts $r$ and $t$ before the contact U engages $v$ and $x$. At the "reverse indicating" position, contact T bridges $s$ and $u$ at the left hand end at the same time that contact U bridges $w$ and $y$. The final movement to "reverse" carries T to the right hand end of $s$ and $u$ and U away from $w$ and $y$. In returning to the "normal" position T is carried off $s$ and $u$ before U reaches $w$ and $y$ but T arrives at the right hand end of $r$ and $t$ at the same time that U arrives at $v$ and $x$.

E and $E^1$ are electro-magnets and D is a permanent magnet which, together with the movable tongue G and fixed contacts $h$, $h^1$, $j$ and $j^1$ form an electro-magnetic circuit controller for directly controlling the circuits to the switch operating motor. The circuits of the magnets E and $E^1$ are governed by the controllers T and U, jointly. The magnets E and $E^1$ are preferably wound with a large number of turns of small wire having a large resistance, thus limiting the current through the magnets to a small amount.

H is the magnet coil of a relay having two windings, one of a few turns of large wire, the other of a large number of turns of small wire. The magnet coil H acts on the lever $l$, which with the stop $k$, forms a circuit controller. The magnet H is constructed so as to be actuated by either alternating or direct current.

To describe the operation of "reversing" the track switch reference will be made first to Fig. 2 in which the lever R is shown placed in the position to set up the circuits for effecting the reversal. With this position of the various parts current will flow from the positive end of battery O through wire 1, contacts $s$, T, $u$, wires 6, 8, 13, magnet E, wires 25, 26, magnet $E^1$, wires 12, 9, 5, contacts $y$, U, $w$, wire 3, indication motor P, and wire 2 to the middle point of battery O. This current has no effect on the indication motor P, as it is an induction motor not affected by direct current, but it energizes the magnets E and $E^1$ so that in conjunction with the permanent magnet D they move the tongue G to the side to bridge the contacts $h$ and $j$, thus closing another circuit so that current flows from wire 8, which, as noted above, is in connection with positive of battery O, through wire 11, field coil F, wire 17, contact $j$, tongue G, contact $h$ wires 15, 18, brush $b$, armature A, brush $b^1$, wires 27, 28 to negative end of the battery O. This current drives the armature A in a direction to "reverse" the track switch through the intermediate mechanism mentioned above. When the switch mechanism has been moved a short distance the contact $c$ will be made to bridge the contacts $e$ and $n$, thus closing another branch circuit so that current will flow from wire 25, (which as seen above, is in connection with positive of battery by way of magnet E), through the high resistance coil of magnet H, wire 23, contacts $e$, $c$, $n$, wire 19, brush $b^2$, armature A, brush $b^1$, wires 27 and 28 to negative of battery O. The magnet H being energized thereby lifts the lever $l$ into contact with the stop K, thus closing a break in the indication circuit which is finally completed when the switch movement has been completely made and the contact $c$ is made to bridge the contacts $f$ and $o$, as shown in Fig. 3. The wire 9, which as above, is connected to the middle of the battery through the indication motor P, is then connected by the bridging of the contacts $f$ and $o$ through the said contacts, wires 21, 22, lever $l$, stop $k$, wire 24, short coil of magnet H, wires 20 and 19 to the brush $b^2$. The brush $b^2$ bears on a ring which is connected to one segment of the commutator of the armature A. As the armature A continues to rotate driven by current through the circuit traced above, the brush $b^2$ will be alternately connected to the brushes $b$ and $b^1$, that is, it will be alternately connected to conductors leading from the positive and the negative of the battery. An alternating current will thereby be caused to flow through the conductor connecting the middle of the battery O and the brush $b^2$ which said conductor includes the coils of the indication motor P and the short coil of the magnet H. This current circulating in the coil of the magnet H causes the lever $l$ to be held against the stop $k$ thus maintaining the circuit. Flowing in the coils of the motor P it causes the armature to rotate and the weights $p$ and $p^1$ to diverge and lift the latch L, thus releasing the lever R. The method above mentioned for transforming the battery current into an alternating current for indication purposes is fully described in my pending application, Serial No. 224,421. The movement of the lever R to its full "reverse" position separates the contact U from the contacts $w$ and $y$, thus breaking the circuit of the indication motor and the short coil of the magnet H. As the circuit of the long coil of magnet H was broken when the contact $c$ was separated from the contacts $e$ and $n$, the breaking of the short coil circuit by the final movement of the lever will cause the magnet H to be deënergized and allow the lever $l$ to fall away from the stop $k$. The separation of the lever $l$ and stop $k$ will break the only remaining return path for current through the magnets E and $E^1$, the other path having been broken by the separation of the contacts U, $w$ and $y$. The deenergizing of the magnets E and $E^1$ will allow the tongue G to be pushed away from the contact $j$ by the spring $h$, which also serves as contact, thus breaking the circuit carrying current through the switch operating motor. The terminal of the magnet E, in the reversed position of the lever, remains in connection with the positive pole of the battery through wires 13, 8, 6, contacts $u$, T, $s$, and wire 1.

The circuits for effecting the "normal" movement of the track switch are similar to those above described. The current flows through the magnets E and $E^1$ in the opposite direction to that for effecting the "reverse" movement, that is, it enters at $E^1$ and leaves at E. This causes the tongue G to bridge $j^1$ and $h^1$ closes a circuit on the field coil $F^1$ which causes the armature A to rotate in the opposite direction to that for effecting the "reverse" movement. In the "normal" position of the lever as shown in Fig. 1 the terminal of the magnet $E^1$ remains in connection with the positive pole of the battery through wires 12, 9, 7, contacts $t$, T, $r$, and wire 1.

If, with the apparatus as shown in Fig. 1, a mechanical force is applied to the switch operating mechanism tending to move it away from "normal" position, it may respond to the force until it has been moved far enough to cause the contact $c$ to bridge the contacts $e$ and $n$ which should occur before the lock bolt has been withdrawn. This contact being made a current will flow from wire 9 through magnet $E^1$, wire 26, long coil of magnet H, wire 23, contacts $e$, $c$, $n$, wire 19, brush $b^2$, armature A, brush $b^1$, and wires 27 and 28 to negative of battery O. This current through the magnet $E^1$ is in the same direction as the current through it when making the "normal" movement so that the tongue G will be moved to bridge the contacts $j^1$ and $h^1$ and current will flow from wire 9 through wire 10, field coil $F^1$, wire 16, contacts $j^1$, G, $h^1$, wires 14, 18, brush $b$, armature A, brush $b^1$, wires 27 and 28 to negative of battery. This current will cause the switch to be brought back to "normal" position. It can readily be seen that the same measure of protection is present in the "reverse" position of the switch.

If with the apparatus as shown in Fig. 1 a charged operating wire, not carrying current, of some other switch should become accidentally connected with the wire 8 at any point, no effect would be produced because both terminals of the magnets E, $E^1$, would then be connected to points of equal potential. If the wire accidentally connected to the wire 8 should be carrying current at the time, its potential would be lower than that of the wire 9 which is not carrying current, so that a current would flow from the wire 9 through wire 12, magnet $E^1$, wires 26, 25, magnet E, and wire 13 to wire 8. This current is in the direction of the "normal" operating current and would, if strong enough, cause the tongue G to bridge the contacts $j^1$ and $h^1$ and close the "normal" operating circuit through the motor A, causing the armature A to rotate in the direction it had in making the "normal" movement. As the clutch C is at this time disengaged for the "normal" rotation, no effect is produced other than to idly rotate the armature A. If the wire 8 should become connected to a wire from the negative of the battery, the last mentioned results would evidently ensue. No wire in the system could have a higher potential than the wire 9 as the wire 9 is connected to the positive of the battery and is not carrying current.

If the wire 9 or any of the connections should be broken and a wire either positively or negatively charged should be connected to wire 8 no effect would be produced as in that case the terminal of $E^1$ would be disconnected from battery so that no current could flow through E, $E^1$. The only combination of conditions that could cause an improper movement is, separation of wire 9 from positive of battery and connection with negative, and the connection of wire 8 with positive, three things quite improbable of simultaneous accidental occurrence.

If a positively charged wire should be connected to wires 14, 15 or 18, a current would flow through armature A, but not through either field coil and there would be no field magnetism to produce a torsional force except residual magnetism, and that would be the result of the last opeating current. Consequently, if it were strong enough to cause rotation, this rotation would be in the direction of the last movement and would have no effect on the switch.

What I claim as my invention and desire to secure by Letters Patent is:

1. The combination with an apparatus for moving a railway part or appliance comprising a motor, a source of current, and an operating wire and an indication wire, of an electro-magnetic device for controlling the current to the motor, a circuit comprising the said operating and indication wires and the coils of said electro-magnetic device, a lever, and a circuit controller actuated by the lever for controlling the current in said circuit.

2. The combination with an apparatus for moving a railway part or appliance comprising a motor, a source of current, and an operating wire and an indication wire, of a polarized electro-magnetic device for controlling the current to the motor, a circuit comprising the said operating and indication wires and the coils of the said polarized electro-magnetic device, a lever, and a pole changer actuated by the lever for reversing the current in said circuit.

3. The combination with an apparatus for moving a railway part or appliance, comprising a motor, a source of current, an operating wire, an indication wire, and a common wire, of an electro-magnetic device for controlling the current to the motor, a circuit comprising the said operating and indication wires and the coils of the said electro-magnetic device, a circuit comprising the said operating wire, the common wire, and the motor, a lever, and a circuit controller actuated by the lever for controlling the current in said circuits.

4. The combination with an apparatus for moving a railway part or appliance comprising a motor, a source of current, an operating wire, an indication wire, and a common wire, of a polarized electro-magnetic device for controlling the current to the motor, a circuit comprising the operating wire, the indication wire, and the coils of said polarized device, a circuit comprising one of said operating wires, the common wire and the motor, a lever, and a pole changer actuated by the lever for controlling the current in said circuits.

5. In combination with an apparatus comprising an electric motor for moving a railway part or appliance, a source of current supply, a circuit controller and operating lever, circuits extending between said source, circuit controller and motor, an electro-magnetic device comprising a polarized armature included in said circuits and said polarized armature controlling branch circuits including the motor, an electro-magnet having two windings also included in said circuits and operating a circuit controller controlling indication circuits.

6. In combination with an apparatus comprising an electric motor for moving a railway part or appliance, a source of current supply, a circuit controller, a lever operating said circuit controller, an electro-magnetic apparatus comprising a polarized armature and spring contacts with which it alternately engages, circuit controlled by the said armature and including the motor and source of supply, and other circuits including the circuit controller operated by the lever the electro-magnets of the electro-magnetic apparatus and source of supply, which circuits are opened and closed by the movements of the lever to permit of the opening and closing of the motor circuits by said armature and spring contacts.

7. In combination with an apparatus comprising an electric motor for moving a railway part or appliance, a source of current supply, a lever operating said circuit controller, an indicating mechanism for said lever, indicating circuits, an electro-magnetic apparatus comprising a polarized armature and spring contacts with which it alternately engages, circuits controlled by the said armature and including the source of supply and motor, an electro-magnet operating a circuit controller in the indicating circuits, and other circuits including the circuit controller operated by the lever the electro-magnets of the electro-magnetic apparatus, the electro-magnet and source of current supply, which last mentioned circuits are opened and closed at one point by the circuit controller operated by the lever and at another point by the said electro-magnet.

In testimony whereof I have signed my name to this specification in the presence of two subscribed witnesses.

JOHN D. TAYLOR.

Witnesses:
W. W. COLEMAN,
W. L. McDANIEL.